July 4, 1950          O. W. CARLSON          2,514,211
ADJUSTABLE EXTRUSION MACHINE
Filed March 12, 1947          2 Sheets-Sheet 1
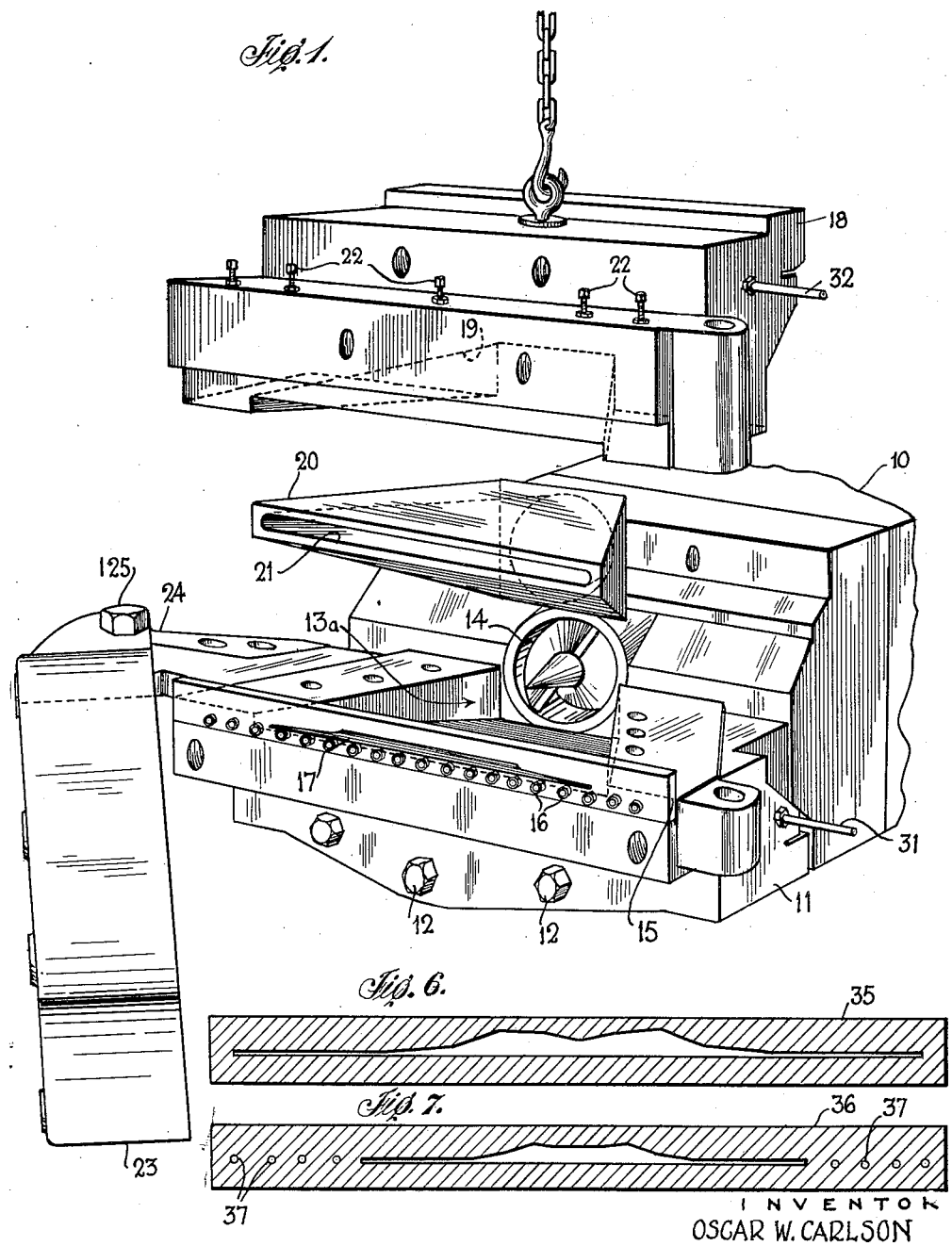
INVENTOR
OSCAR W. CARLSON
BY
ATTORNEYS

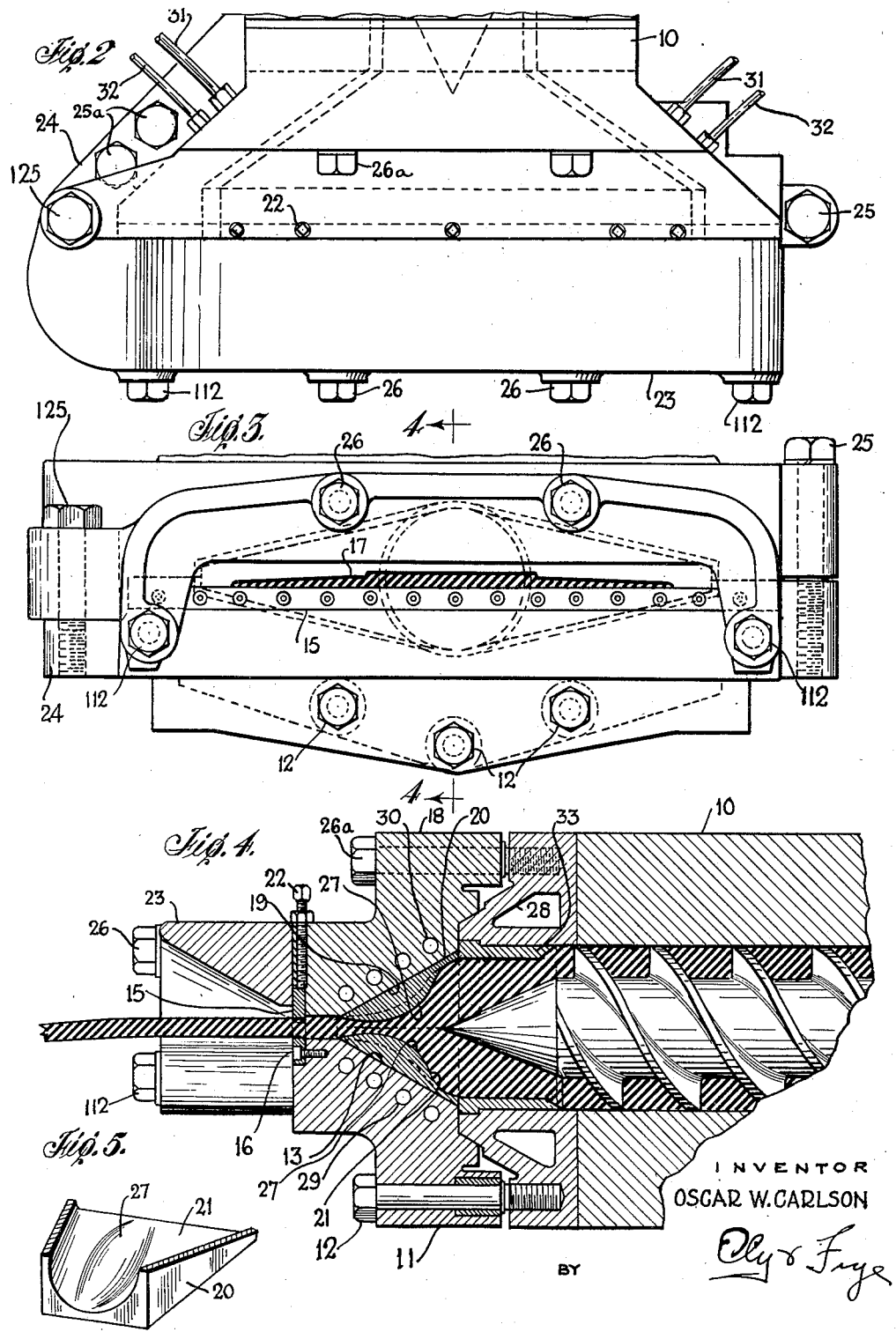

Patented July 4, 1950

2,514,211

UNITED STATES PATENT OFFICE 2,514,211

ADJUSTABLE EXTRUSION MACHINE

Oscar W. Carlson, Cuyahoga Falls, Ohio, assignor to The Firestone Tire & Rubber Company, Akron, Ohio, a corporation of Ohio Application March 12, 1947, Serial No. 734,081

4 Claims. (Cl. 18—12)

This invention relates to tubing or extruding machines, especially to extrusion machines primarily adapted for forming of unvulcanized rubber tread stock for pneumatic tires.

The formation of tread stock for pneumatic tires is one prime example of use for the improved extruding machine described herein, but it will be realized that the machine can be used for the production of other continuous lengths of plastic material to be formed to a desired cross-sectional contour.

In the production of tire treads, the rubber, in plastic condition, is formed under pressure through an extruding die, secured in an extrusion head, to form a continuous ribbon-like element usually varying in transverse thickness, for example, being of minimum depth or thickness in the marginal areas. Heretofore, different extrusion heads have been used for each contour or size of tread desired, although in some instances, minor deviations or variations in the tread contour have been produced by changing the die plate associated with the extrusion head. However, for any appreciable change in size or contour of the extruded material, a new extrusion head would usually have to be used in place of the head previously used on the machine. As some extruded products may be several inches in thickness and be as much as 24 to 30 inches in width, substantial extrusion pressures are employed, necessitating extrusion heads of massive construction. Such extrusion heads are usually made from a cast metal block which is carefully machined and polished to the desired size, with the die surface areas formed in such heads being extremely smooth and of a precise, predetermined contour in order to obtain the desired extrusion action. Thus the extrusion heads are quite costly while they also are somewhat expensive to maintain, and are difficult to change due to their weight and size. It requires several men several hours to change the extrusion head on a large extrusion machine.

The general object of this invention is to avoid and overcome the foregoing and other disadvantages of and objections to known types of extrusion heads, and to provide an extrusion head which is characterized by its ability to form any of a variety of extrusion shapes and contours.

Another object of the invention is to simplify the change of extrusion contour of an extrusion machine and to reduce the number of changes of the extrusion head.

Another object of the invention is substantially to reduce the amount of labor involved and to shorten the inoperative period of the machine attendant an extrusion head change.

Yet another object of the invention is to reduce the number of different extrusion heads required to produce a given number of extruded shapes.

A further and more specific object of the invention is to provide removable baffles in an extrusion head so as to adapt it to produce any of a variety of extrusion contours.

The foregoing and other objects and advantages of the invention, which will be made more apparent as the specification proceeds, are achieved by the provision of the apparatus shown in the accompanying drawings wherein:

Fig. 1 is an exploded perspective view of an extrusion head embodying the principles of the invention;

Fig. 2 is a plan view of the head of Fig. 1;

Fig. 3 is a fragmentary front elevation of the extrusion head of Fig. 1;

Fig. 4 is a longitudinal vertical section taken on line 4—4 of Fig. 3;

Fig. 5 is a horizontal section through the baffle member of the invention;

Figs. 6 and 7 are vertical sections through the extreme sizes of dies that can be used with an extrusion head such as that shown in Figs. 1 through 4.

Referring more in detail to the structure shown in the accompanying drawings, the extrusion or tuber machine 10 shown includes an extrusion head base 11 secured thereto in any suitable manner, as by bolts 12. The lower surface of the top section 18 and the upper surface of base section 11 are bevelled at 19 and 13 respectively, through a central portion thereto, to define a tapered, wedge-shaped chamber 13a in the extrusion head. A unitary removable baffle or stock flow control member 20 is removably positioned in the chamber formed between the extrusion head sections 11 and 18. The extrusion head sections 11 and 18 are usually made from easily workable cast metal blocks not necessarily machined to highly accurate dimensions, whereas the removable baffle member 20 is provided with a throat 27 machined to an exact size and contour to effect proper flow, relative to transverse portions of a die, of plastic material forced therethrough to prepare such material for flow through die opening 17.

Fig. 1 clearly shows that the recess 13a is appreciably wider and shallower at its forward or discharge end than it is at its stock receiving end, and a rectangular die plate 15 is secured to the base 11 at its front edge by screws 16. The die plate 15 has a suitably shaped die opening 17 formed therein for forming the extruded material to the desired contour. To complete the external portion of the machine, an upper section 18 of the extrusion head of the invention is provided and it is adapted to engage with the upper surface of the extrusion head base 11 to form an extrusion chamber. The upper section 18 is adapted to receive a plurality of cap screws 22 adjusted to bear upon the upper surface of the die plate 15, to aid in securing it in place.

A front or reenforcing member 23 is ordinarily provided to reenforce the die plate 15, and it is shown as being pivotally secured to an arm 24 by a bolt 125 extending from and supported by the extrusion machine 10. Bolts 25 and 25a are provided to secure the upper extrusion head section 18 to the lower section 11. Bolts 26 extend through the front member 23 and into the upper section 18 of the extrusion head for clamping engagement therebetween. Bolts 26a extend through the section 18 and into the extrusion machine 10 to secure the extrusion head section and member 23 to the extrusion machine proper, while bolts 112 secure the member 23 to the base 11.

A primary feature of the invention is that stock flow through the extrusion head of the invention is controlled by the small, easily changed, relatively inexpensive baffle member 20. Fig. 4 of the drawings shows that the member 20 is provided with inwardly extending baffles 27 of irregular contour and arranged to effect movement or flow of the stock being extruded from the opening 14 in circular cross-sectional form to a widened and flat rectangular form in cross section preparatory to flow through the die opening 17. The baffles 27 are formed as continuations of the surfaces of throat 21 and are integral with the member 20. Thus, should it be desired to change the size die opening used in the extrusion machine, one would merely have to release the front member 23, remove bolts 26a, lift up the extrusion head section 18 and then substitute a new baffle member for that previously used in the machine. A new die plate also would be provided for use in producing the new contour extrusion shape desired. In some instances it may only be necessary to change the shape of the die opening in the die plate by substitution of die plates, but for any substantial changes in the contour and shape of the material to be extruded, it is necessary to insert a new baffle member for that previously used. By using relatively small, removable baffle members for controlling changes in the extruded material, one extrusion head can be adapted to produce a great variety of shapes and sizes of extruded material. This adaptability of the extrusion head naturally avoids manufacture and stocking of the wide variety of solid, close tolerance, costly extrusion heads that would be required in accordance with conventional practice prior the present invention. It also is apparent that the labor involved in changing an extrusion head is simplified by the invention since one only need remove a few bolts and lift the extrusion sections apart, whereas previous practice required that a large, heavy extrusion head be threaded into engagement with the extrusion machine and such action is much more difficult to accomplish than a simple unbolting and lifting action.

Fig. 4 also indicates that a cooling fluid conduit 28 may be formed in the extrusion machine for receipt and circulation of suitable coolant therein. A spiral shaped fluid path may also be formed by conduits 29 and 30, in registry in lower and upper sections 11 and 18 for intercommunication therebetween and with fluid inlet and outlet conduits 31 and 32. A sleeve 33 may be positioned at the mouth 14 of the extrusion machine as shown in Fig. 4, to present an unbroken contour with the surface of throat 21 and baffles 27. Suitable sleeves of varying thickness may be provided for use with the various baffle members employed.

The various members 20 used in practice of the invention naturally would have the same external contours but would have widely varying throat 21 and baffles 27 to form the extruded material to any general shape desired. Figs. 6 and 7 illustrate a pair of die plates 35 and 36 usable in tire tread forming, plate 36 being provided laterally of the tread forming aperture with bores 37 to permit excess stock to flow out of the extrusion chamber. This procedure is desirable in some cases even though the stock flow baffles have been varied widely, since stock may accumulate at the edges of the die. Excess stock flowing through bores 37 may be led directly back to the extrusion machine for reforming. Use of bores 37 adds appreciably to the sizes of extruded shapes obtainable from one extrusion head by varying the number of members 20.

In accordance with the patent statutes, one complete embodiment of the invention has been illustrated and described in detail but the invention is not limited to the specific example set forth since modification may be resorted to within the scope of the appended claims.

What is claimed is:

1. In combination in an extrusion machine having a discharge mouth, a fixed support, an extrusion head base section adapted to be removably secured to said support, an extrusion head upper section adapted to be removably associated with said base section and said support, said extrusion head sections having corresponding tapered recesses formed in their associated surfaces to define an extrusion chamber, said extrusion chamber being in communication with and mating with the discharge mouth of the machine and being thicker at its material receiving end than at its discharge end, a hollow one piece extrusion baffle member removably positioned in the extrusion chamber and adapted to receive material forced from the extrusion machine, said baffle member having a plurality of ribs formed therein for shaping plastic material flowing therethrough, and means removably engaging said base section and said upper section to the fixed support whereby said extrusion baffle member is fixedly but removably positioned in the path of flow of the extruded material so a different baffle member can be substituted when the shape of the extruded material is to be varied.

2. In an extruding machine, an extruding head base section, means for fixed support of said section, an extruding head upper section removably associated with said base section having a dividing line therebetween and defining an extruding chamber therewith, means for applying pressure to work material, and a one piece baffle member removably positioned in the extruding chamber and adapted to receive, transmit and shape work material under pressure, said dividing line being such that the upper section may be lifted free of said baffle member.

3. In an extruding machine, a fixed extruding head section, a removable extruding head section associated with said fixed section and defining therewith a baffle receiving chamber, means associated with said head sections for applying pressure to work material to be forced therethrough, a removable baffle having a work transmitting opening therethrough positioned in said baffle receiving chamber, said head sections being divided along parting surfaces substantially parallel to the direction of flow of said work material, whereby the removable section may be separated from the fixed section to provide access for removing and replacing said baffle in said baffle receiving chamber.

4. In an extruding machine, separable extruding head sections defining a baffle receiving chamber, means associated with said head sections for applying pressure to work material to be forced therethrough, a removable baffle having a work material shaping, guiding and transmitting opening therethrough positioned in said baffle receiving chamber, said head sections being divided along parting surfaces substantially parallel to the direction of flow of said work material, whereby the sections may be separated from each other to provide access for removing and replacing said baffle in said baffle receiving chamber.

OSCAR WM. CARLSON.

REFERENCES CITED

The following references are of record in the file of this patent:

UNITED STATES PATENTS

| Number | Name | Date |
|---|---|---|
| 1,252,821 | Lewis | Jan. 8, 1918 |
| 1,768,790 | Royle | July 1, 1930 |
| 2,061,407 | Royle | Nov. 17, 1936 |